United States Patent
Ju et al.

(10) Patent No.: US 12,523,299 B2
(45) Date of Patent: Jan. 13, 2026

(54) GASKET AND METHOD OF MANUFACTURING THE SAME

(71) Applicant: GM Global Technology Operations LLC, Detroit, MI (US)

(72) Inventors: Stephen Ju, Rochester, MI (US); Min Liu, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/658,575

(22) Filed: May 8, 2024

(65) Prior Publication Data

US 2025/0347344 A1 Nov. 13, 2025

(51) Int. Cl.

| | |
|---|---|
| *F16J 15/10* | (2006.01) |
| *B29C 64/30* | (2017.01) |
| *B33Y 40/20* | (2020.01) |
| *B33Y 80/00* | (2015.01) |
| B29K 75/00 | (2006.01) |
| B29L 31/26 | (2006.01) |

(52) U.S. Cl.
CPC ............. *F16J 15/104* (2013.01); *B29C 64/30* (2017.08); *B33Y 40/20* (2020.01); *B33Y 80/00* (2014.12); B29K 2075/00 (2013.01); B29L 2031/265 (2013.01)

(58) Field of Classification Search
CPC .......... B29L 2031/265; B29K 2075/00; B33Y 40/20; B33Y 80/00; B29C 64/30; F16J 15/027; F16J 15/104
See application file for complete search history.

(56) References Cited

U.S. PATENT DOCUMENTS

| | | | | |
|---|---|---|---|---|
| 3,729,205 A | * | 4/1973 | Kwok | F16J 15/104 428/156 |
| 4,442,174 A | * | 4/1984 | Neumann | F16J 15/104 428/398 |
| 4,575,578 A | * | 3/1986 | Bogan | B29C 70/882 277/944 |
| 5,093,055 A | * | 3/1992 | Skiff | B29C 44/184 264/45.2 |
| 5,580,068 A | * | 12/1996 | Gundy | F16J 15/022 277/615 |
| 10,731,760 B2 | * | 8/2020 | Ishigami | F16J 15/0893 |
| 11,598,168 B2 | * | 3/2023 | Pelto | E21B 33/12 |
| 2004/0000763 A1 | * | 1/2004 | Gernand | F16J 15/061 277/630 |
| 2004/0135322 A1 | * | 7/2004 | Weisbrodt | F16J 15/104 277/608 |
| 2004/0157035 A1 | * | 8/2004 | Guizzetti | B32B 27/322 428/66.6 |

(Continued)

FOREIGN PATENT DOCUMENTS

| | | |
|---|---|---|
| DE | 102017206065 A1 | 10/2018 |
| DE | 112019000294 T5 | 10/2020 |

(Continued)

*Primary Examiner* — Eugene G Byrd
(74) *Attorney, Agent, or Firm* — Honigman LLP; Matthew H. Szalach; Jonathan P. O'Brien

(57) ABSTRACT

An additively manufactured gasket comprising a main body, comprising an outer wall, an inner wall opposite the outer wall, and a hollow chamber defined by the inner wall. The additively manufactured gasket further comprising an uncured powder core arranged in the hollow chamber.

20 Claims, 7 Drawing Sheets

(56) References Cited

U.S. PATENT DOCUMENTS

| | | | | |
|---|---|---|---|---|
| 2005/0218606 | A1* | 10/2005 | Sakazaki | F16L 33/18 277/627 |
| 2005/0223536 | A1* | 10/2005 | Botrie | F16J 15/14 29/527.2 |
| 2011/0169228 | A1* | 7/2011 | Karram | F16J 15/061 277/650 |
| 2011/0175299 | A1* | 7/2011 | Guimet | F16L 23/165 277/650 |
| 2012/0025471 | A1* | 2/2012 | Andrick | E03F 3/04 156/306.6 |
| 2015/0176363 | A1* | 6/2015 | Mazyar | E21B 23/06 264/41 |
| 2016/0363223 | A1* | 12/2016 | Schoellhammer | F16J 15/108 |
| 2017/0138480 | A1* | 5/2017 | Yu | F16J 15/061 |
| 2017/0159817 | A1* | 6/2017 | Robinson | B32B 7/12 |
| 2017/0321805 | A1* | 11/2017 | Louaisil | F16J 15/061 |
| 2018/0100582 | A1* | 4/2018 | Li | F16J 15/102 |
| 2019/0011049 | A1* | 1/2019 | Yanagitake | F16J 15/125 |
| 2020/0190278 | A1* | 6/2020 | Gardner | B32B 5/18 |
| 2020/0263791 | A1* | 8/2020 | Whitehead | F16J 15/104 |
| 2020/0286694 | A1* | 9/2020 | Motoki | F16J 15/062 |
| 2022/0186835 | A1* | 6/2022 | Lin | H05K 9/0015 |
| 2022/0341495 | A1* | 10/2022 | Gardner | F16J 15/102 |
| 2023/0132709 | A1* | 5/2023 | Kennedy | F16J 15/104 277/616 |
| 2023/0349648 | A1* | 11/2023 | Kilchyk | F04D 29/4206 |

FOREIGN PATENT DOCUMENTS

| | | | |
|---|---|---|---|
| JP | 2014007360 A * | 1/2014 | F16J 15/104 |
| JP | 7321061 B2 | 8/2023 | |

\* cited by examiner

GASKET AND METHOD OF MANUFACTURING THE SAME

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a gasket and, more particularly, to an additively manufactured gasket.

Press-in-place (PIP) gaskets or seals are commonly used in engines (e.g., cam cover, oil pan, front cover, water pump, etc.), transmissions (side cover, transmission pan, electrical module cover, etc.), electrical systems, and energy systems. In many instances, PIP gaskets are designed to fit into complex groove patterns on mating surfaces on an interface. Additionally, these gaskets are designed to withstand a wide variety of environments, fluids, pressures, and temperatures. Fabrication of tooling required to manufacture these conventional PIP gaskets is time consuming. Thus, a need exists for manufacturing gaskets without relying traditional injection molding techniques.

SUMMARY

In one configuration, an additively manufactured gasket is provided and includes a main body, including an outer wall, an inner wall opposite the outer wall, and a hollow chamber defined by the inner wall. The additively manufactured gasket further includes an uncured powder core arranged in the hollow chamber.

Implementations of the disclosure may include one or more of the following optional features. For example, the main body may include a first feature extending from the outer wall at a first section. The first feature may be a stabilizing feature and may be at least partially embedded in the main body. The main body may include a second feature extending from the outer wall at a second section. The second feature may be a retention feature and may be at least partially embedded in the main body.

According to at least one aspect, the additively manufactured gasket further includes a total gasket volume. The uncured powder core can occupy between 75% and 90% of the total gasket volume.

According to another aspect, the main body and the uncured powder core are both made of a thermoplastic urethane.

In at least one example, the main body includes a height, a gap, and a thickness between in the inner wall and the outer wall. The height may be greater than 7.8 millimeters (mm) and less than 8.5 mm, the gap may be greater than 1.0 mm and less than 1.5 mm, and the thickness may be greater than 0.5 mm and less than 1.0 mm.

In another configuration, a vehicle is provided and includes a vehicle component including an additively manufactured gasket. The additively manufactured gasket includes a main body made of a thermoplastic urethane material, including an outer wall defining a height of the main body, an inner wall opposite the outer wall defining a gap of the main body, a thickness between the outer wall and the inner wall, and a hollow chamber defined by the inner wall, the hollow chamber having gasket chamber volume. The main body further including one or more intermittent retention features, including a first feature extending from the outer wall and a second feature spaced from the first feature and extending from the outer wall. The additively manufactured gasket further including an uncured powder core made of the same material as the main body and arranged in the hollow chamber, the uncured powder core including a powder volume that is substantially similar to the gasket chamber volume.

Implementations of the disclosure may include one or more of the following optional features. For example, the height of the additively manufactured gasket can be greater than 7.8 millimeters (mm) and less than 8.5 mm, the gap of the additively manufactured gasket can be greater than 1.0 mm and less than 1.5 mm, and the thickness of the additively manufactured gasket can be greater than 0.5 mm and less than 1.0 mm.

According to at least one aspect, the first feature of the additively manufactured gasket can be a stabilizing feature and can be at least partially embedded in the main body. The second feature of the additively manufactured gasket can be a retention feature at least partially embedded in the main body.

According to another aspect, the additively manufactured gasket can further include a total gasket volume. The uncured powder core of the additively manufactured gasket can occupy between 75% and 90% of the total gasket volume.

In yet another configuration, a method of manufacturing a gasket is provided and includes additively manufacturing a main body, including an outer wall, an inner wall opposite the outer wall, a hollow chamber defined by the inner wall, and one or more features extending from the outer wall. The method of manufacturing a gasket further includes treating the outer surface of the main body.

Implementations of the disclosure may include one or more of the following optional features. For example, the hollow chamber includes an uncured powder core. The uncured powder may be made of the same material as the main body.

According to at least one aspect, treating the outer surface of the main body further includes vapor polishing the outer wall and the one or more features.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
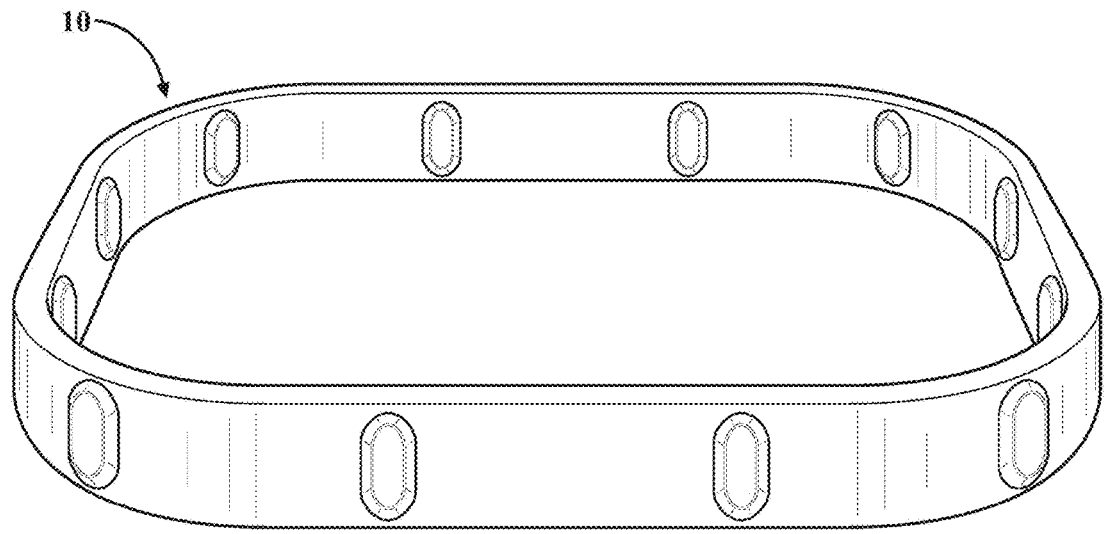
FIG. 1 is a perspective view of a gasket according to principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

With reference to FIG. 1, an additively manufactured gasket or seal 10 is provided. The gasket 10 can also be referred to as a press-in-place (PIP) gasket. Conventionally, PIP gaskets are manufactured using injection molding, have a solid core (i.e., no hollow portion), and can be used in a variety of environments, fluids, pressures, and temperatures. Manufacturing gaskets using other techniques, such as additive manufacturing, gives rise to a number of challenges that conventional injection molded gaskets or solid core gaskets do not encounter.

Figure 2:
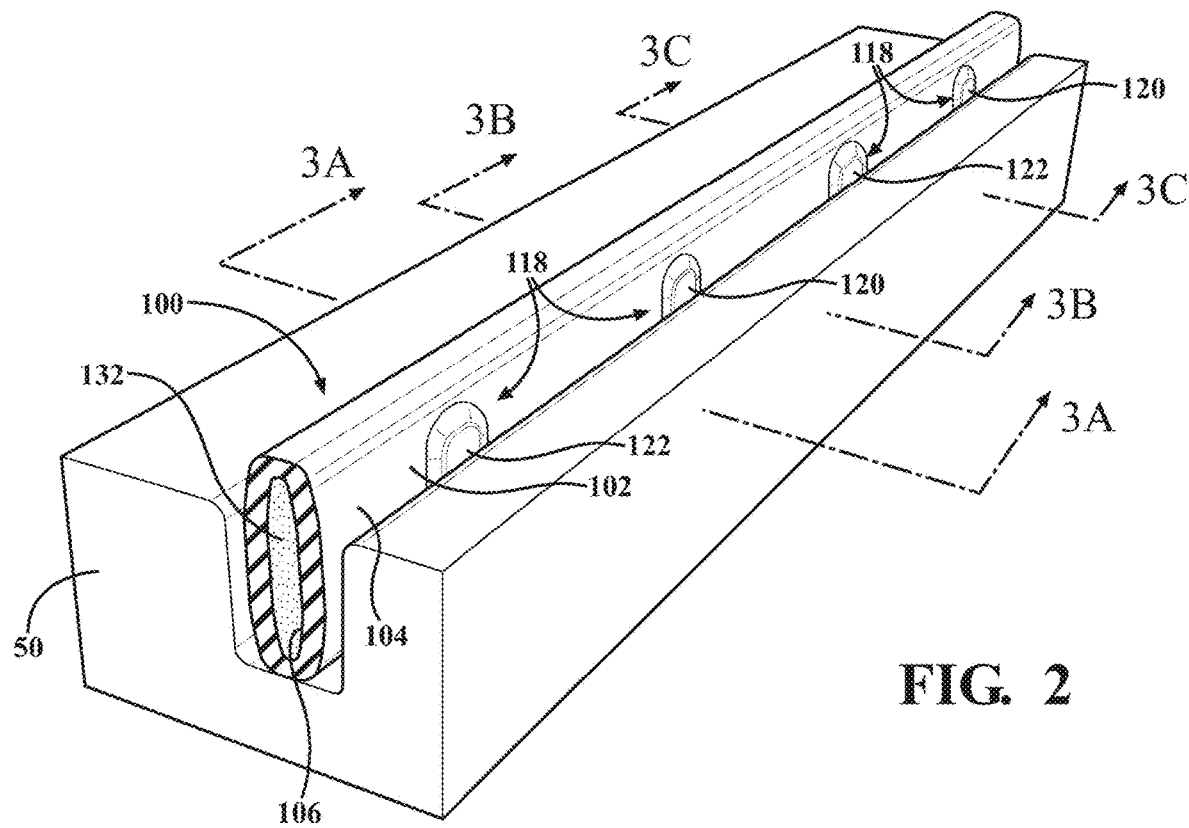
FIG. 2 is a fragmentary perspective view of a gasket arranged in a groove according to the principles of the present disclosure.

With reference to FIG. 2, a fragmentary perspective view of another configuration of an additively manufactured gasket 100 is provided and arranged in a portion of a groove 50. In this example, the groove 50 is four millimeters (mm) wide by six millimeters deep. Note, the principles of the present disclosure equally apply to grooves of different shapes, sizes, and/or dimensions.

Figure 3A:
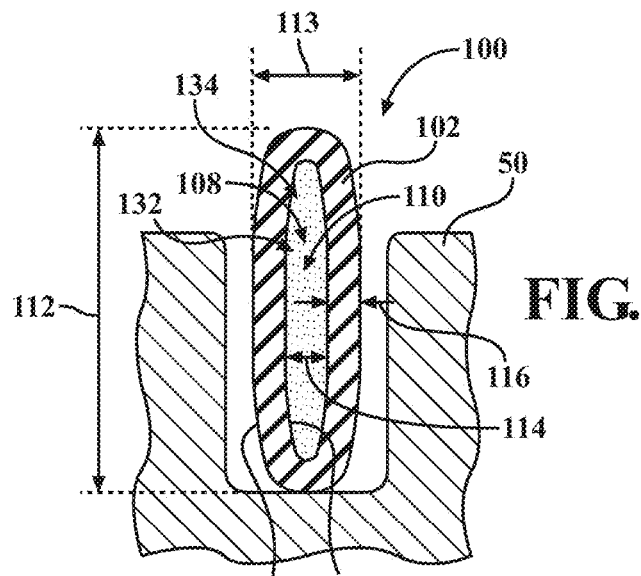
FIG. 3A is a cross-sectional view of the gasket of FIG. 2 at line 3A-3A.

With reference to FIGS. 2 and 3A-3C, the gasket 100 can include a main body 102 comprising an outer wall 104, an inner wall 106 opposite the outer wall 104, and a hollow chamber 108 defined by the inner wall 106. The hollow chamber 108 includes a gasket chamber volume 110. The gasket chamber volume 110 can be represented as the product of the cross-sectional area of the hollow chamber 108 and a length of a perimeter of the gasket 100. The main body 102 may be further defined by a height 112, a width 113, a gap 114, and a thickness 116 between the inner wall 106 and the outer wall 104. In the present example, the height 112 can be greater than 7.8 mm and less than 8.5 mm, the gap 114 can be greater than 1.0 mm and less than 1.5 mm, and the thickness 116 can be greater than 0.5 mm and less than 1.0 mm. The main body 102 can have a substantially oval shape, as shown in FIG. 3A. Additionally, the main body 102 can be made of thermoplastic urethane (TPU), thermoplastic elastomers (TPE), or another material commonly used to additively manufacture (e.g., polymer powder bed fusion) vehicle components, for example.

The main body 102 can include one or more intermittent retention features 118. The one or more intermittent retention features 118 can be at least partially embedded in the main body 102 and/or extend from the outer wall 104. The one or more intermittent retention features 118 can include a first feature 120 and a second feature 122. The first feature 120 can be a stabilizing feature that stabilizes the gasket 100 within the groove 50. The first feature 120 can be further defined by a first width 124 and a first height 126. The first width 124 is less than the width of the groove 50 and the first height 126 is greater than half of the height 112 of the gasket 100. The second feature 122 is spaced from the first feature 120 and may be referred to as a retention feature that retains the gasket 100 within the groove 50. The second feature 122 can be further defined by a second width 128 and a second height 130. The second width 128 is greater than the width of the groove 50 and the second height 130 is greater than half of the height 112 of the gasket 100.

Figure 3B:
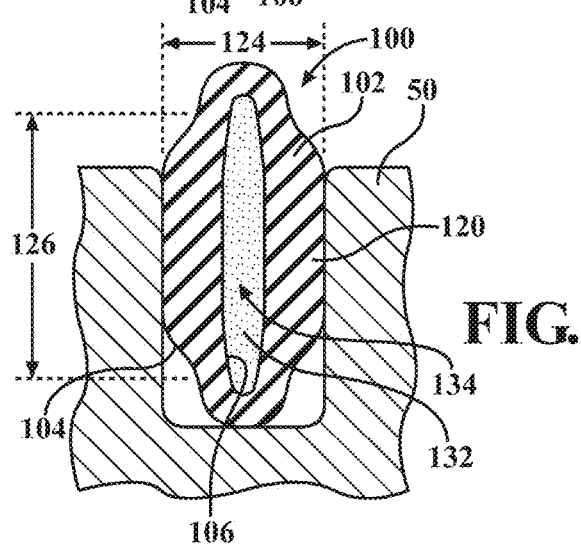
FIG. 3B is a cross-sectional view of the gasket of FIG. 2 at line 3B-3B.
Figure 3C:
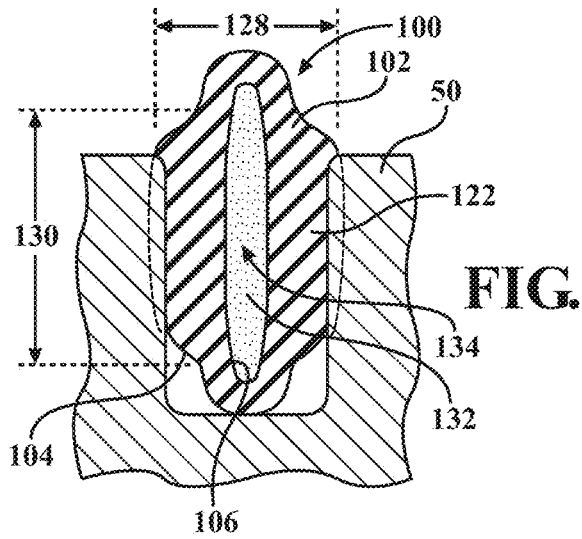
FIG. 3C is a cross-sectional view of the gasket of FIG. 2 at line 3C-3C.

With reference to FIGS. 3A, 3B, and 3C, the gasket 100 can further include an uncured powder core 132 arranged in the hollow chamber 108. In the present configuration, the uncured powder core 132 is the same material as the main body 102. Thus, if the main body 102 is manufactured using thermoplastic urethane then the uncured powder core 132 is also made of thermoplastic urethane in its raw and unprocessed state. The uncured powder core 132 can occupy between 75% and 90% of a total gasket volume of the gasket 100. The total gasket volume can include a volume of the main body 102 and the chamber volume 110 that is occupied by the uncured powder core 132.

At the outset of manufacturing the additive manufactured gasket 100, a thin layer of material (e.g., thermoplastic urethane powder) is melted using a laser or ultraviolet (UV) light so that a single anisotropic layer is formed. A second thin layer of material (e.g., thermoplastic urethane powder) is provided on the first layer and treated with the laser or UV light so that the first layer and second layer are formed together as a single anisotropic structure. This process can be repeated until the main body 102 is formed as a single anisotropic structure. During manufacturing of the gasket 100, select material is not treated by the laser or UV light and, thus, will remain uncured (i.e., does not undergo a material altering process). In other words, the uncured powder core 132 is gradually trapped within the main body 102 as the main body 102 is additively manufactured around the uncured powder core 132. As will be discussed in more detail below, the uncured powder core 132 can serve as a dashpot which can provide stability when the gasket 100 is under compressive loads, thus ensuring greater than 20% compression ratio is achieved for robust sealing. Additively manufacturing the gasket 100 ensures the main body 102 is airtight and robust to a wide range of temperatures without failure.

FIGS. 4, 5A, 5B, and 5C illustrate another illustrative configuration of an additively manufactured gasket 200. This configuration is similar in many respects to the configuration of FIGS. 2, 3A, 3B, and 3C. Accordingly, the descriptions of the configurations are hereby incorporated into one another, and description of subject matter common to the configurations generally may not be repeated.

Figure 4:
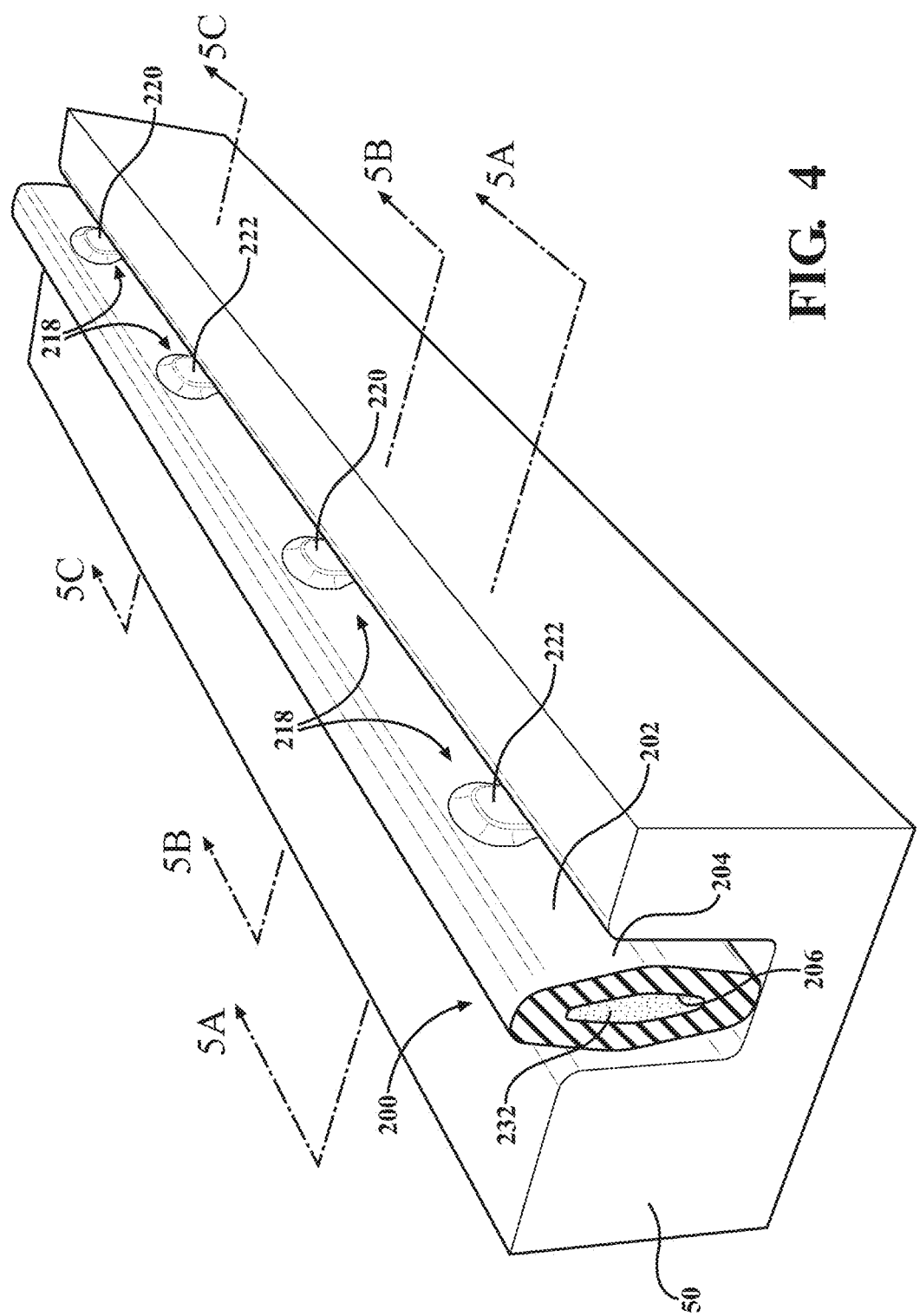
FIG. 4 is a fragmentary perspective view of another configuration of a gasket arranged in a groove according to the principles of the present disclosure.
Figure 5A:
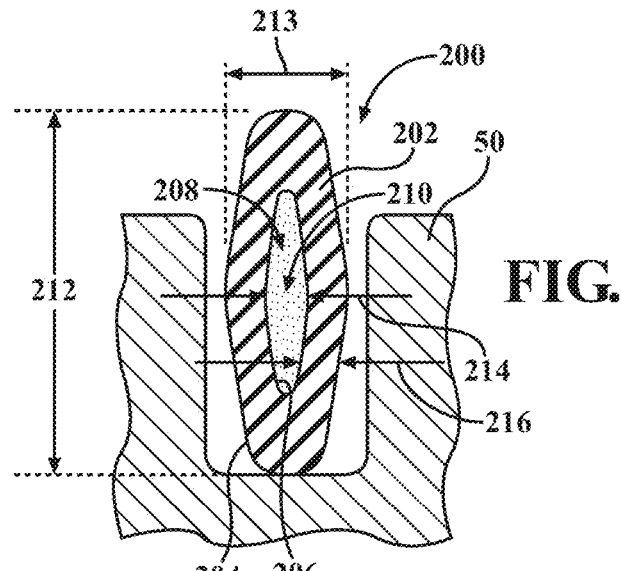
FIG. 5A is a cross-sectional view of the gasket of FIG. 4 at line 5A-5A.

With reference to FIG. 4, the additively manufactured gasket 200 is provided and arranged in a portion of the groove 50. The gasket 200 can include a main body 202 comprising an outer wall 204, an inner wall 206 opposite the outer wall 204, and a hollow chamber 208 defined by the inner wall 206, as shown in FIG. 5A. The hollow chamber 208 includes a gasket chamber volume 210. In the present configuration, the main body 202 can have a substantially diamond shape. The main body 202 may be further defined by a height 212, a width 213, a gap 214, and a thickness 216 between in the inner wall 206 and the outer wall 204.

Figure 5B:
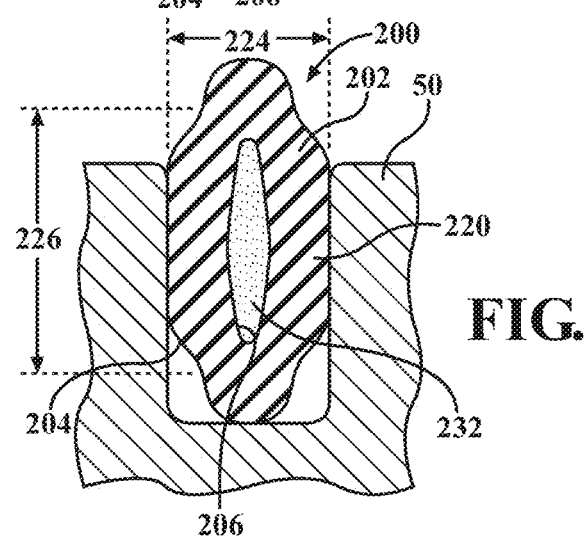
FIG. 5B is a cross-sectional view of the gasket of FIG. 4 at line 5B-5B.
Figure 5C:
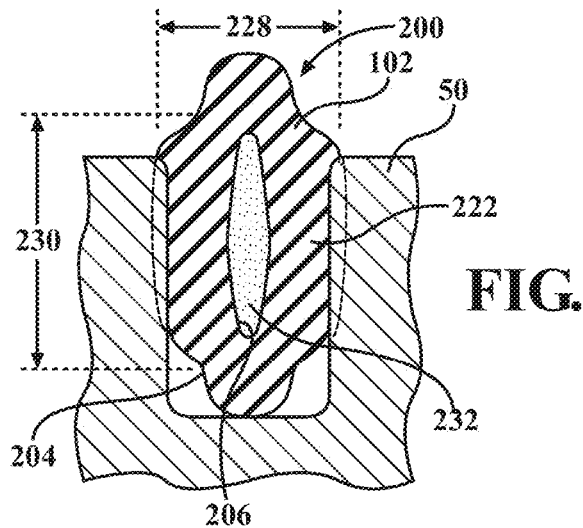
FIG. 5C is a cross-sectional view of the gasket of FIG. 4 at line 5C-5C.

With reference to FIGS. 5B and 5C, the main body 202 can include one or more intermittent retention features 218. The one or more intermittent retention features 218 can be at least partially embedded in the main body 202 and/or extend from the outer wall 204. The one or more intermittent retention features 218 can include a first feature 220 and a second feature 222. The first feature 220 can be a stabilizing feature that stabilizes the gasket 200 within the groove 50. The first feature 220 can be further defined by a first width 224 and a first height 226. The first width 224 is less than the width of the groove 50 and the first height 226 is greater than half of the height 212 of the gasket 100. The second feature 222 is spaced from the first feature 220 and may be referred to as a retention feature that retains the gasket 100 within the groove 50. The second feature 222 can be further defined by a second width 228 and a second height 230. The second width 228 is greater than the width of the groove 50 and the second height is greater than half of the height 212 of the gasket 100.

With reference to FIGS. 5A, 5B, and 5C, the gasket 200 can further include an uncured powder core 232 arranged in the hollow chamber 208. In the present configuration, the uncured powder core 232 is the same material as the main body 202.

Figure 6:
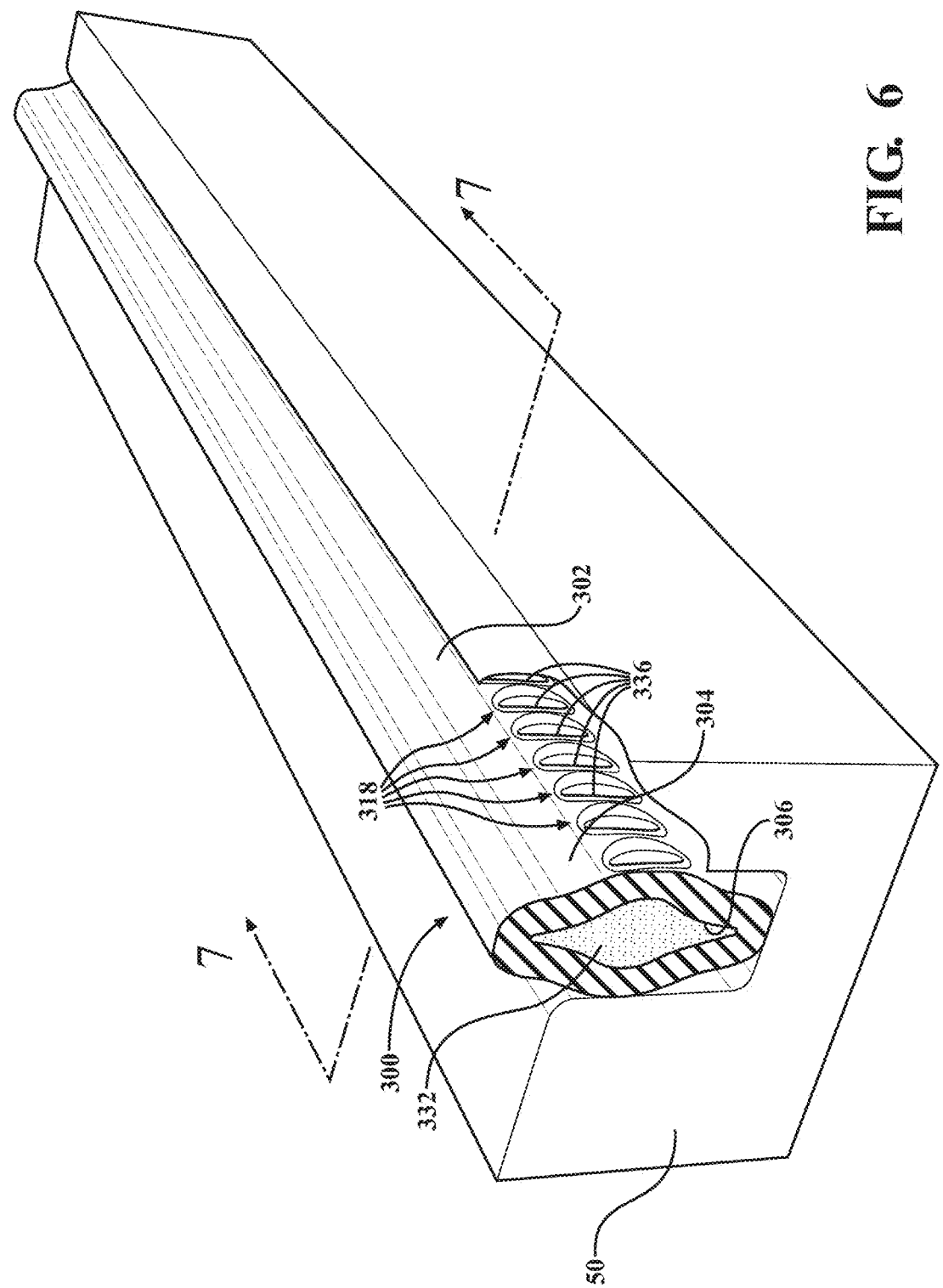
FIG. 6 is a fragmentary perspective view of another configuration of a gasket arranged in a groove according to the principles of the present disclosure.
Figure 7:
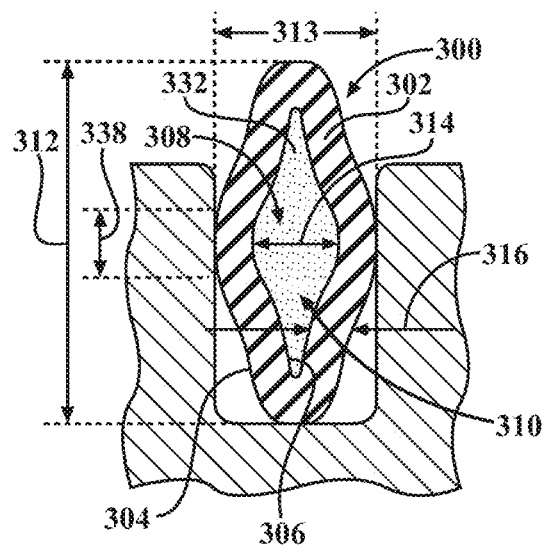
FIG. 7 is a cross-sectional view of the gasket of FIG. 6 at line 7-7.

FIGS. 6 and 7 illustrate another illustrative configuration of an additively manufactured gasket 300. This configuration is similar in many respects to the configurations of FIGS. 2 and 3A-3C and FIGS. 4 and 5A-5C. Accordingly, the descriptions of the configurations are hereby incorporated into one another, and description of subject matter common to the configurations generally may not be repeated.

With reference to FIG. 6, the additively manufactured gasket 300 is provided and arranged in a portion of a groove 50. The gasket 300 can include a main body 302 comprising an outer wall 304, an inner wall 306 opposite the outer wall 304, and a hollow chamber 308 defined by the inner wall 306, as shown in FIG. 7. The hollow chamber 308 includes a gasket chamber volume 310. In the present configuration, the main body 302 can have a generally marquise shape, as shown in FIG. 7. The main body 302 may be further defined by a height 312, a width 313, a gap 314, and a thickness 316 between in the inner wall 306 and the outer wall 306.

With reference to FIG. 7, the main body 302 can include one or more intermittent retention features 318. The one or more intermittent retention features 318 can be at least partially embedded in the main body 302 and/or extend from the outer wall 304. The one or more intermittent retention features 318 can include a ribbed feature 336. The ribbed feature 336 can be referred to as a retention feature that retains the gasket 300 within the groove 50. When compared to the first features 120, 220 and the second features 122, 222 of the gaskets 100, 200, there is less contact between each ribbed feature 336 and the groove 50. The ribbed feature 336 can be further defined by a rib height 338 that is less than half the height 312 of the gasket 300.

With reference to FIG. 7, the gasket 300 can further include an uncured powder core 332 arranged in the hollow chamber 308. In the present configuration, the uncured powder core 332 is the same material as the main body 302.

Figure 8A:
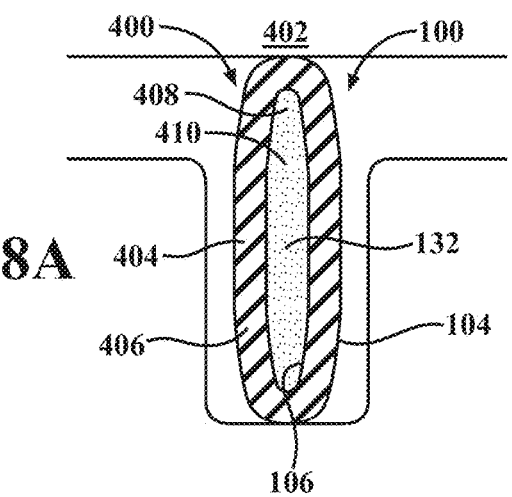
FIG. 8A is a cross sectional view of the gasket of FIG. 1 under compression of a mass according to the principles of the present disclosure.
Figure 8B:
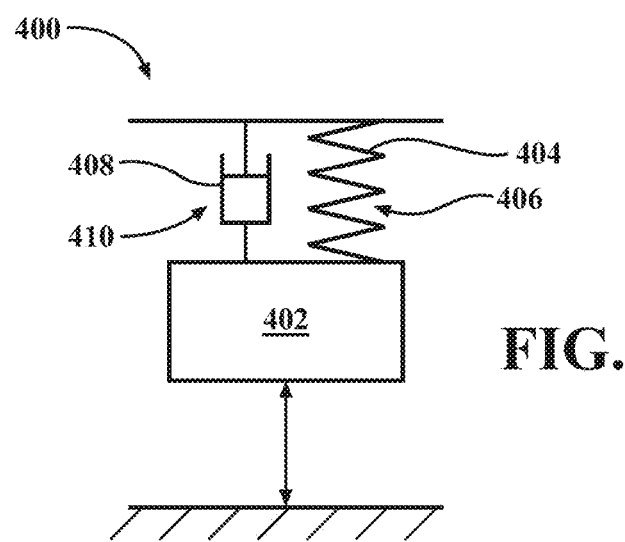
FIG. 8B is a diagram of a Kevin-Voigt material model system according to the principles of the present disclosure.

With reference to FIGS. 8A and 8B, the gaskets 100, 200, 300 of the present disclosure can be compared to Kevin-Voigt material model 400 when under compressive loads from a mass 402 (i.e., represented as m in FIG. 8B). The mass 402 can be a groove-less mating flange, which compresses down on the gasket 100 during joint closure. With reference to FIG. 8, the main body 102 can act as a spring 404 and comprise a spring constant 406 (i.e., spring constant k in FIG. 8B). Additionally, the uncured powder core 132 can act as a dashpot 408 and comprise a damping coefficient 410 (i.e., damping coefficient c in FIG. 8B). The uncured powder 132 provides some degree of damping upon joint closure and can be desirable for maintaining stability of the cross section (e.g. making it less susceptible to buckling during joint closure).

Figure 9:
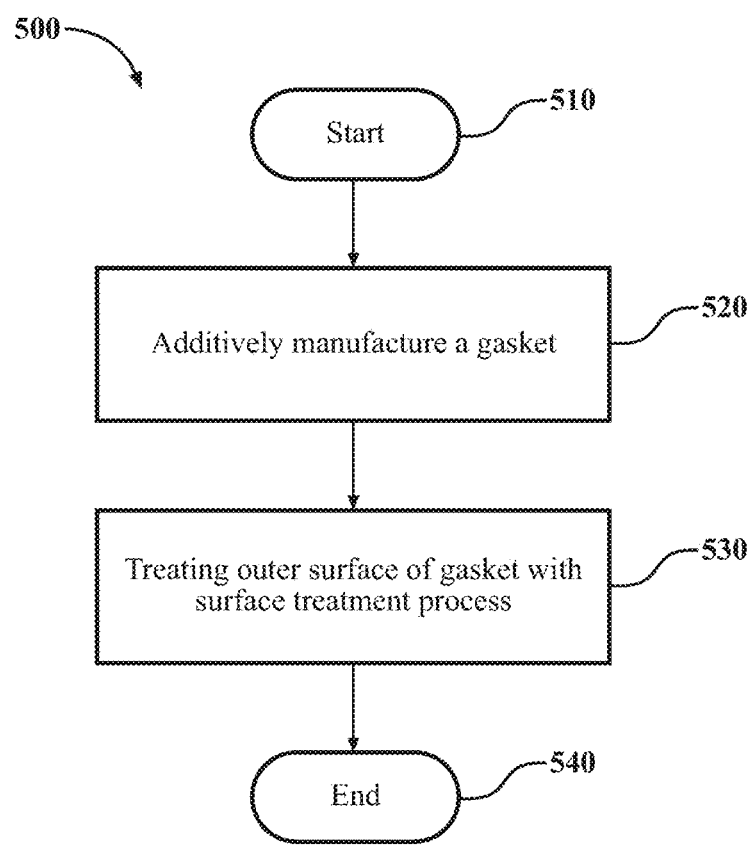
FIG. 9 is a flow chart depicting a method of manufacturing a gasket according to the principles of the present application.

With reference to FIG. 9, a method 500 of manufacturing the gaskets 100, 200, 300 is provide according to the principles of the present disclosure. At 510, the method 500 is initiated. In practical terms, the method 500 is initiated when an additive manufactured machine or chamber (e.g., 3D printer, powder bed fusion machine, etc.) is programmed to build, manufacture, and/or produce at least one of the gaskets 100, 200, 300. The remaining steps of method 500 will be discussed with reference to manufacturing the gasket 100, but equally apply to manufacturing the gaskets 200, 300 as well.

At 520, the main body 102 is additively manufactured to include the outer wall 104 the inner wall 106 opposite the outer wall 104, the hollow chamber 108 defined by the inner wall 106, and the one or more intermittent retention features 118 at least partially embedded in the main body 102 and/or extending from the outer wall 104. During 502, as indicated above, the uncured powder core 132 is trapped by the main body 102 as the main body 102 is additively manufactured.

At 530, the outer wall 104 is treated with a surface treatment process such as vapor polishing. After 520, the outer wall 104 can have some degree of unevenness and/or surface porosity that may be resolved with the vapor polishing of another surface treatment process. Treating the surface of the outer wall 104 may be desirable to improve performance of the gasket 100 and prevent leaks that could otherwise result from surface porosities.

At 540, the method 500 ends.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. An additively manufactured gasket, comprising:
   a main body, comprising:
     an outer wall,
     an inner wall opposite the outer wall, and
     a hollow chamber defined by the inner wall; and
   an uncured powder core being trapped within the hollow chamber during additive manufacturing and configured to elastically deform to accommodate dimensional tolerances, the uncured powder core being made of a thermoplastic urethane that remains in a raw and unprocessed state.

2. The additively manufactured gasket of claim 1, wherein the main body comprises a first feature extending from the outer wall at a first section.

3. The additively manufactured gasket of claim 2, wherein the first feature is a stabilizing feature and is at least partially embedded in the main body.

4. The additively manufactured gasket of claim 3, wherein the main body comprises a second feature extending from the outer wall at a second section.

5. The additively manufactured gasket of claim 4, wherein the second feature is a retention feature and is at least partially embedded in the main body.

6. The additively manufactured gasket of claim 1, further comprising a total gasket volume.

7. The additively manufactured gasket of claim 6, wherein the uncured powder core occupies between 75% and 90% of the total gasket volume.

8. The additively manufactured gasket of claim 1, wherein the main body and the uncured powder core are both made of the same material.

9. The additively manufactured gasket of claim 1, wherein the main body comprises a height, a gap, and a thickness between the inner wall and the outer wall.

10. The additively manufactured gasket of claim 9, wherein the height is greater than 7.8 millimeters (mm) and less than 8.5 mm, the gap is greater than 1.0 mm and less than 1.5 mm, and the thickness is greater than 0.5 mm and less than 1.0 mm.

11. A vehicle, comprising:
    a vehicle component, comprising:
      an additively manufactured gasket, comprising:
        a main body made of a thermoplastic urethane material, comprising:
          an outer wall defining a height of the main body,
          an inner wall opposite the outer wall defining a gap of the main body,
          a thickness between the outer wall and the inner wall, and
          a hollow chamber defined by the inner wall, the hollow chamber having gasket chamber volume,
        one or more intermittent retention features, comprising:
          a first feature extending from the outer wall, and
          a second feature spaced from the first feature and extending from the outer wall; and
        an uncured powder core made of the thermoplastic urethane material, the uncured powder core being trapped within the hollow chamber during additive manufacturing remaining in a raw and unprocessed state, the uncured powder core being configured to elastically deform to accommodate dimensional tolerances and having a powder volume that is substantially similar to the gasket chamber volume.

12. The vehicle of claim 11, wherein the height of the additively manufactured gasket is greater than 7.8 millimeters (mm) and less than 8.5 mm, the gap of the additively manufactured gasket is greater than 1.0 mm and less than 1.5 mm, and the thickness of the additively manufactured gasket is greater than 0.5 mm and less than 1.0 mm.

13. The vehicle of claim 11, wherein the first feature of the additively manufactured gasket is a stabilizing feature and is at least partially embedded in the main body.

14. The vehicle of claim 13, wherein the second feature of the additively manufactured gasket is a retention feature at least partially embedded in the main body.

15. The vehicle of claim 11, wherein the additively manufactured gasket further comprises a total gasket volume.

16. The vehicle of claim 15, wherein the uncured powder core of the additively manufactured gasket occupies between 75% and 90% of the total gasket volume.

17. A method of manufacturing a gasket, comprising:
    additively manufacturing a main body, comprising:
      an outer wall, an inner wall opposite the outer wall,
a hollow chamber defined by the inner wall, and
one or more features extending from the outer wall,
an uncured powder core being trapped within the hollow chamber during additive manufacturing and configured to elastically deform to accommodate dimensional tolerances, the uncured powder core is made of a thermoplastic urethane that remains in a raw and unprocessed state; and
treating the outer wall of the main body.

18. The method of claim 17, wherein the uncured powder core is made of the same material as the main body.

19. The method of claim 17, wherein treating the outer wall of the main body further comprises vapor polishing the outer wall and the one or more features.

20. The method of claim 17, wherein the uncured powder core occupies between 75% and 90% of the hollow chamber.

\* \* \* \* \*